Figure 1:
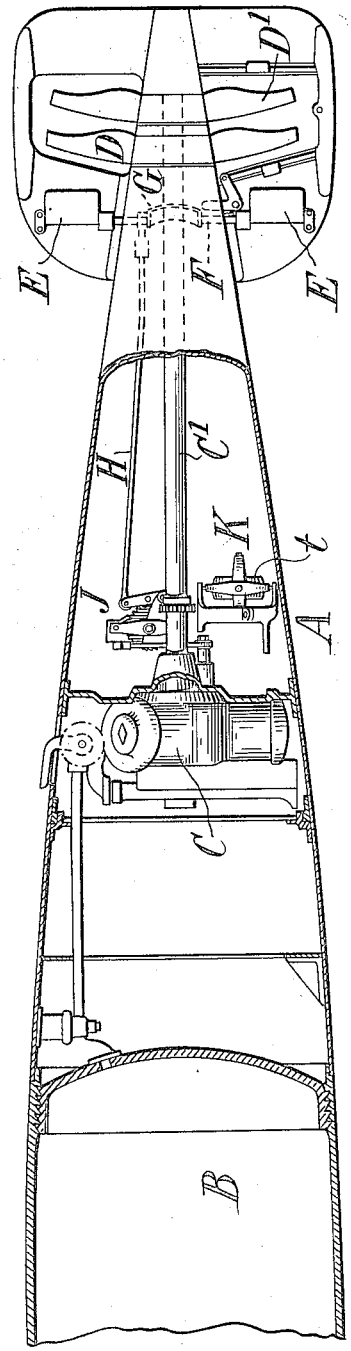

No. 785,425. PATENTED MAR. 21, 1905.
F. M. LEAVITT.
STEERING MECHANISM FOR TORPEDOES.
APPLICATION FILED NOV. 30, 1903.

5 SHEETS—SHEET 1.

WITNESSES:
Fred White
René Bruine

INVENTOR:
Frank M. Leavitt,
By Attorneys,
Arthur C. Fraser &Co

No. 785,425. PATENTED MAR. 21, 1905.
F. M. LEAVITT.
STEERING MECHANISM FOR TORPEDOES.
APPLICATION FILED NOV. 30, 1903.

5 SHEETS—SHEET 2.

WITNESSES:
Fred White
René ? ?

INVENTOR:
Frank M. Leavitt,
By Attorneys,
Arthur C. Fraser

No. 785,425. PATENTED MAR. 21, 1905.
F. M. LEAVITT.
STEERING MECHANISM FOR TORPEDOES.
APPLICATION FILED NOV. 30, 1903.

5 SHEETS—SHEET 3.

WITNESSES:
Fred White
René Bruine

INVENTOR:
Frank M. Leavitt,
By Attorneys,
Arthur C. Fraser & Co.

No. 785,425. PATENTED MAR. 21, 1905.
F. M. LEAVITT.
STEERING MECHANISM FOR TORPEDOES.
APPLICATION FILED NOV. 30, 1903.
5 SHEETS—SHEET 4.
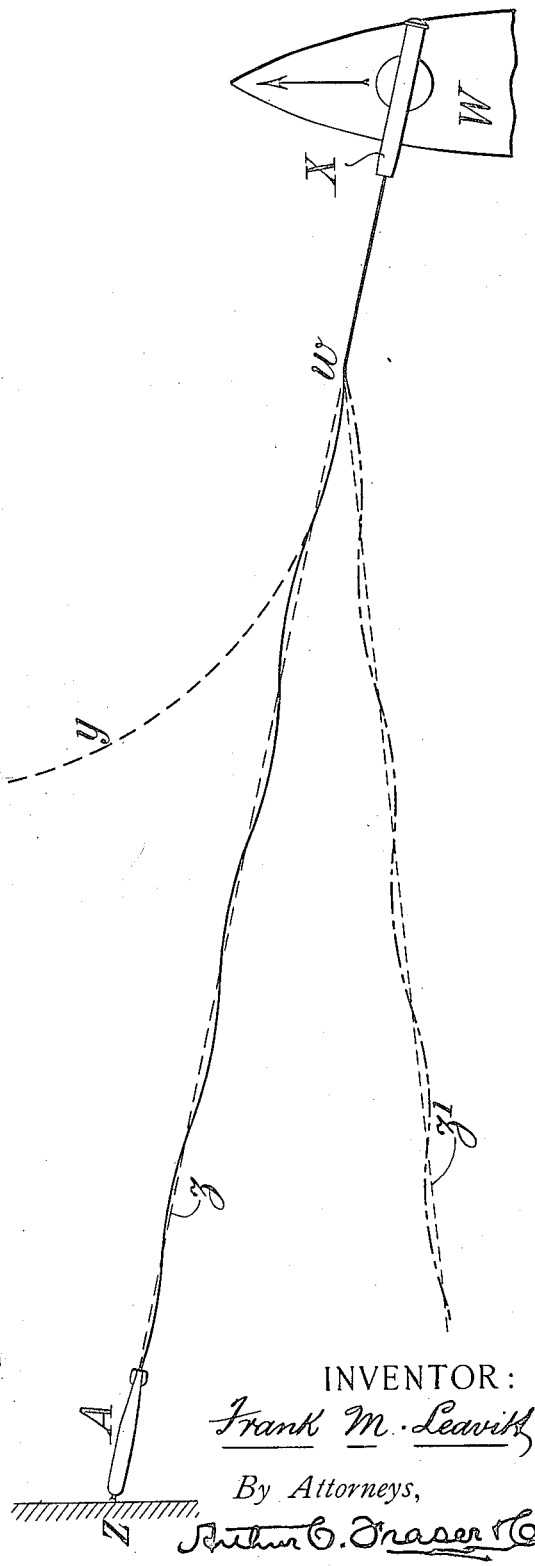
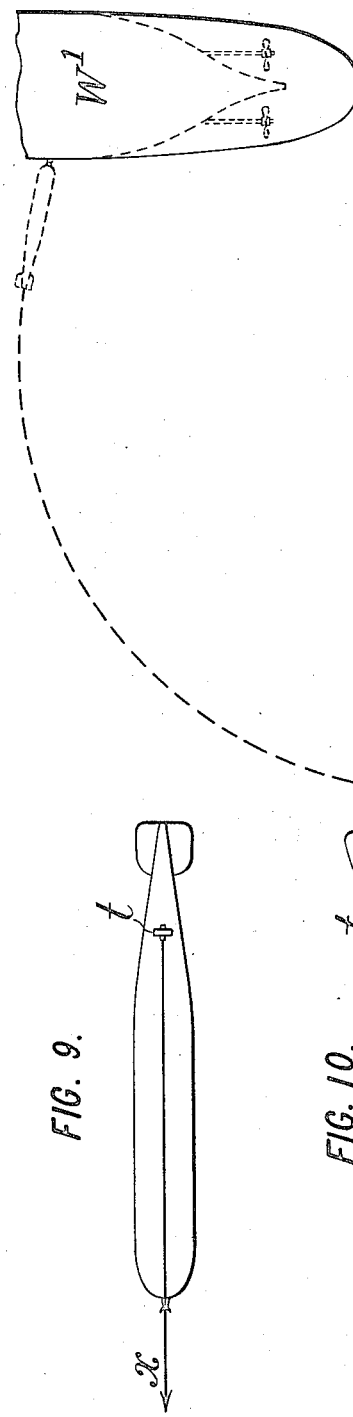
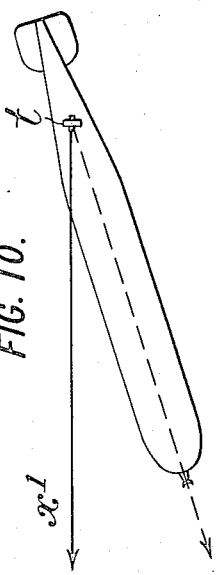
WITNESSES:
Fred White
René Bruine
INVENTOR:
Frank M. Leavitt,
By Attorneys,
Arthur C. Fraser & Co.

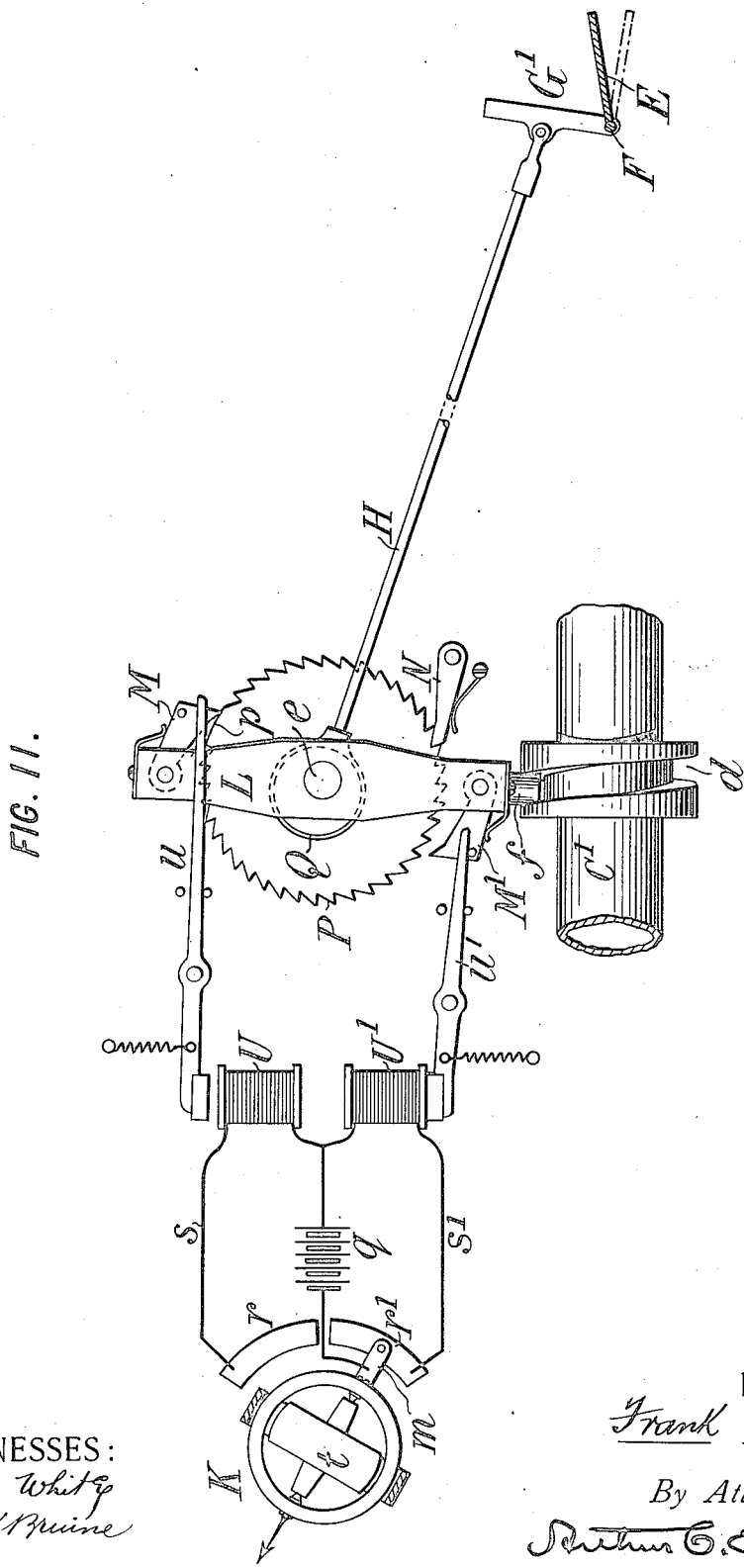

No. 785,425.

Patented March 21, 1905.

UNITED STATES PATENT OFFICE.

FRANK M. LEAVITT, OF NEW YORK, N. Y., ASSIGNOR TO E. W. BLISS COMPANY, OF BROOKLYN, NEW YORK, A CORPORATION OF WEST VIRGINIA.

STEERING MECHANISM FOR TORPEDOES.

SPECIFICATION forming part of Letters Patent No. 785,425, dated March 21, 1905.

Application filed November 30, 1903. Serial No. 183,307.

*To all whom it may concern:*

Be it known that I, FRANK M. LEAVITT, a citizen of the United States, residing in the borough of Brooklyn, county of Kings, city and State of New York, have invented certain new and useful Improvements in Steering Mechanism for Torpedoes, of which the following is a specification.

This invention relates to automatic steering apparatus for an automobile or fish torpedo, such as the Whitehead torpedo. Such a torpedo after being launched has no connection with the firing-station and can be steered only by self-contained mechanism. In the Obry steering mechanism used in the Whitehead torpedo a gyroscope is provided to maintain fixity of direction and to control the steering-engine, which turns the rudder to port or starboard whenever the torpedo deviates beyond a prescribed amount from its true course, so that the torpedo is alternately steered to port and starboard and follows a sinuous path which repeatedly crosses its true or intended course. This mechanism is very delicate and the greatest care is necessary to keep the gyroscope and engine-valve in working order. Since the gyroscope directly operates the valve any unusual resistance of the valve is liable to deflect the gyroscope and defeat the normal steering, and if the valve should get stuck fast in either position it would hold the rudder hard over to either port or starboard and cause the torpedo to steer a circular path, which might result in its blowing up the boat from which it was fired.

This invention provides a steering mechanism which is designed to reduce the liability of abnormal action, with its accompanying peril. To this end the gyroscope is relieved from all direct work, its function being limited to moving an electric contact-finger, which through an electric circuit operates control mechanism which in turn governs the steering apparatus. This steering apparatus is designed when uncontrolled to steer the torpedo on an approximately straight course and is acted upon by the controlling mechanism to cause it to steer the torpedo to port or starboard only when its course varies from the initial course which at the moment of launching was impressed upon the gyroscope. If the control mechanism should fail to operate, the steering apparatus continues its normal operation. The controlling mechanism is energized by an electric battery or generator, and its work is made as light as possible, while for the heavier work performed by the steering apparatus power is taken from the main propelling-motor.

The accompanying drawings illustrate the preferred application of the invention.

Figure 2:
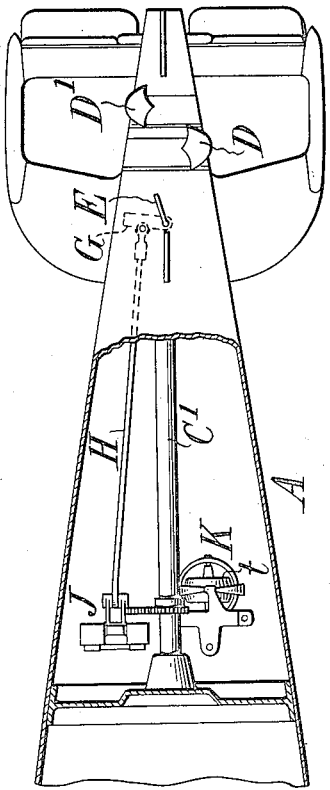
Figure 3:
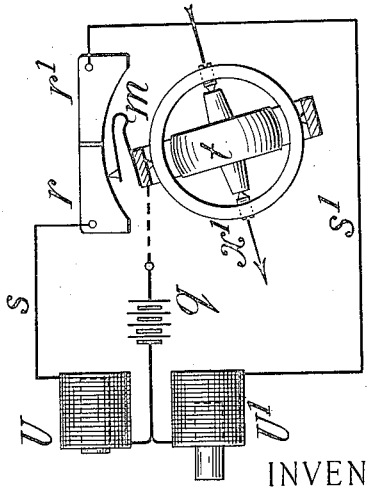
Figure 4:
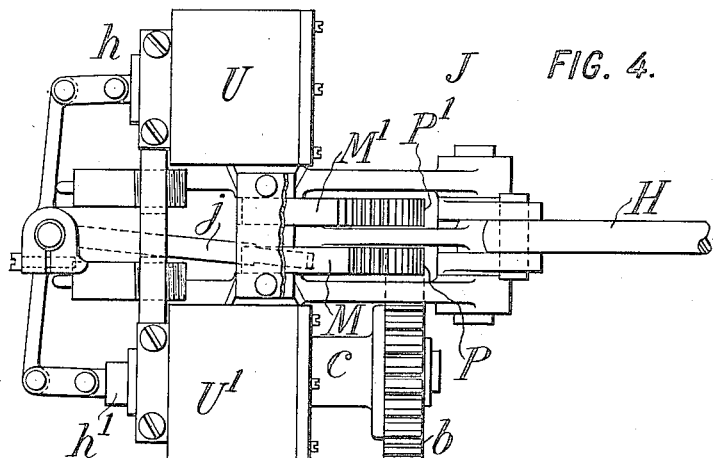
Figure 5:
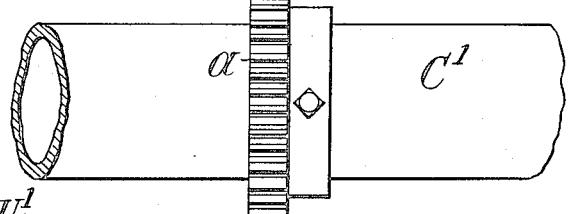
Figure 5:
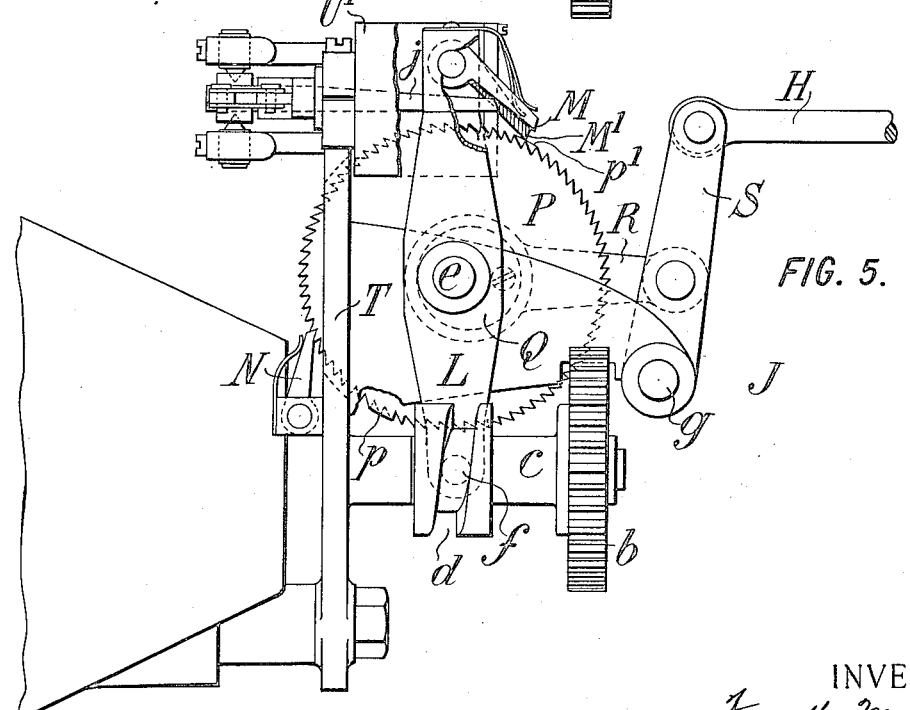
Figure 6:
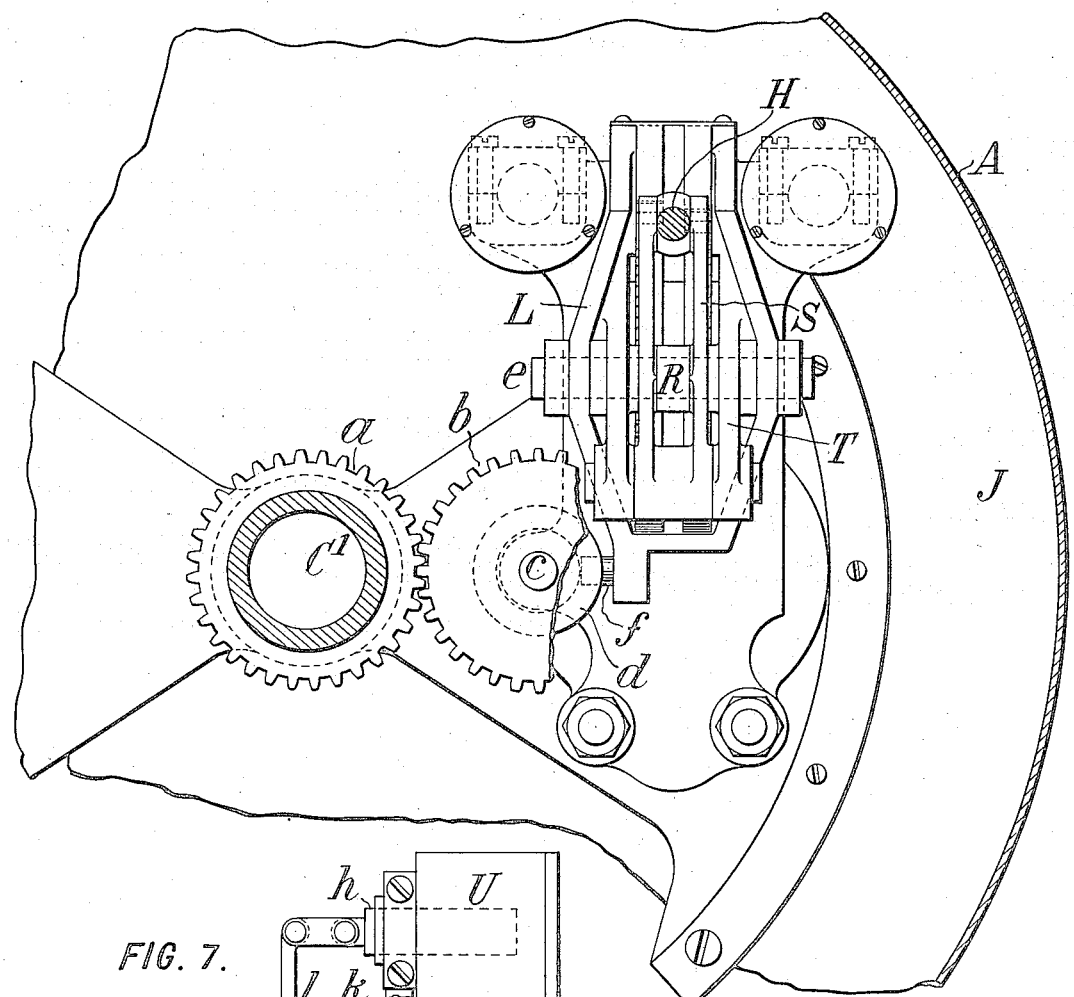
Figure 7:
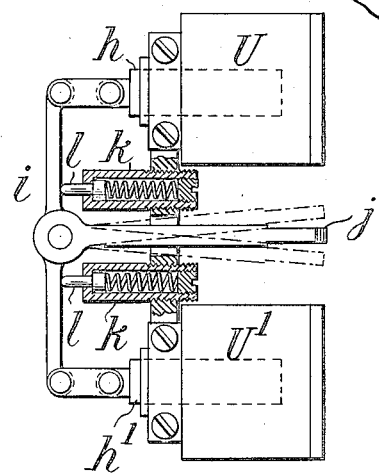

Figure 1 is a vertical section of the afterbody of a Whitehead torpedo containing this invention. Fig. 2 is a partial plan thereof in horizontal section. Fig. 3 is a diagram showing the electric circuits. Fig. 4 is a plan, on a larger scale, of the rudder-actuating mechanism or steering-engine. Fig. 5 is a side elevation thereof. Fig. 6 is a rear elevation thereof. Fig. 7 is a plan of the electromagnetic control mechanism. Fig. 8 is a diagram illustrating the several courses which the torpedo may take. Figs. 9 and 10 are diagrams illustrating the action of the gyroscope. Fig. 11 is a diagram showing the mechanism in simplified form.

In Figs. 1 and 2, A is the torpedo-hull; B, the reservoir of compressed air; C, the engine; C', the engine-shaft; D D', the propeller-screws, and E E the rudders for steering in the horizontal plane. The rudders E E are mounted on a vertical shaft F, having an arm or tiller G, to which is connected a rod H, which extends forward to the steering apparatus J. K is the gyroscope, which may be like that used in the Whitehead torpedo.

The steering apparatus J is shown on a larger scale in Figs. 4, 5, and 6. A gear *a* on the shaft C' drives a gear *b* and its shaft *c*, carrying a cam *d*. A lever L, working on a shaft *e*, has a pin or roller *f* engaged by the cam *d* to incessantly vibrate the lever. This lever carries two pawls M and M', which engage in the teeth of two ratchet-wheels P and P', which turn on the shaft *e* and are fastened together and to an eccentric Q, (conveniently arranged between them,) which operates a connecting-rod R, which is jointed to a lever S, pivoted at $g$, and which communicates the movements of the eccentric to the tiller-rod H. The parts are supported by a frame T, fastened to any convenient support within the torpedo. Stop-pawls at N prevent backward rotation of the ratchet-wheels P P'. This steering apparatus when uncontrolled turns the rudder alternately and equally to port and starboard, so that it steers the torpedo on a sinuous path which follows generally a substantially straight course. So long as this course does not deviate from that upon which the torpedo was first launched the steering apparatus requires no control from the gyroscope. If, however, any deflecting force intervenes to divert the course of the torpedo, then the steering mechanism requires to be controlled in such manner as to prolong the action of the rudder when at either port or starboard, so as to steer the torpedo back to the desired course. This is the function of the control mechanism which is actuated by the gyroscope. This control mechanism comprises two electromagnets or solenoids U U', which actuate a stop or detent by which either pawl M or M' may be thrown out of action. As shown, the cores $h$ $h'$ are connected to opposite arms of a T-lever $i$, the middle arm $j$ of which projects beneath the pawls and normally lies between them, being there held by springs $k$ $k$, acting through stop-plungers $l$ $l$ against the lever $i$, as shown in Fig. 7. In this position both pawls M M' engage their ratchet-wheels; but when either magnet U U' is energized it attracts its core and tilts the lever $i$, so as to throw the arm $j$ to one side, where it stands beneath one of the pawls M or M', so that on the retractile movement this pawl is lifted onto the arm, so that this pawl in vibrating cannot engage or propel the ratchet-wheel. As shown in Figs. 4 and 5, the magnet U is energized, and consequently the pawl M is out of action. The magnets U U' are controlled by the gyroscope K through suitable electric circuits. These circuits may be, for example, as shown in Fig. 3, where the outer gimbal-ring carries a contact-arm $m$, connected to one pole of a battery $q$ and moving over segments $r$ $r'$, connected by wires $s$ $s'$ to the respective magnets U U', and thence to the opposite pole of the battery. The ratchet-wheels P P' have toothless spaces $p$ $p'$ of a width equal to the movement of the pawls. The spaces $p$ $p'$ are arranged diametrically opposite. (See Fig. 5.) When either pawl is lifted by the arm $j$, the other pawl continues to propel the wheels P P' until the toothless space $p$ or $p'$ comes beneath this pawl, whereupon the continued movement of the pawl ceases to move the wheel and the eccentric Q stops in such position as to hold the rudder either at extreme port or extreme starboard, according to which pawl M or M' was lifted.

A simpler (but less desirable) form of the mechanism is shown in Fig. 11. Here the cam $d$ is fixed directly on the shaft C' and the pawls M M' are mounted on the upper and lower arms of the lever L and both engage one ratchet-wheel P, engaging it at diametrically opposite points, so that the wheel requires only one toothless space $p$. The eccentric Q engages directly with the tiller-rod H. The magnets U U' attract armatures mounted on levers $u$ $u'$, the long arms of which act upon pins projecting from the pawls M M'.

In operation the torpedo is placed in a firing-tube, which is aimed at the target or object which the torpedo is to strike. As the torpedo is expelled from the tube the gyroscope fly-wheel is set spinning and the engine is started in the manner usual with the Whitehead torpedo. Hence as the torpedo is launched the axis of the fly-wheel $t$ of its gyroscope points directly toward the target, as indicated by arrow $x$ in Fig. 9. If the torpedo is deflected from its course in the water, as shown, for example, in Fig. 10, the gyroscope nevertheless preserves the direction originally impressed upon it, as shown by the arrow $x'$. Whenever the torpedo is deflected, the segments $r$ $r'$, Fig. 3, are displaced, so that the circuit is closed through one or other of the magnets U U'. If the deflection is to starboard, the circuit is closed through $r$ $s$, Fig. 3, and magnet U attracts its core, tilting the arm $j$ under pawl M, (see Fig. 4,) which is lifted out of engagement with its ratchet-wheel. The other pawl, M', then alone rotates the ratchet-wheels until the toothless space $p'$ comes beneath this pawl, when it ceases to turn the wheels, which stop with the eccentric Q in the position (see Fig. 5) to hold the rudder to port, so that it steers the torpedo back to its original course and by the continued steering effect deflects it to the opposite side, whereupon the contact-arm $m$ passes from segment $r$ to $r'$ and the magnet U' is energized, thereby throwing the arm $j$ to the opposite side, releasing pawl M and lifting pawl M'. The vibration of pawl M then propels the ratchet-wheels for a half-revolution until the toothless space $p$ comes beneath it, whereupon the wheels are stopped with the eccentric Q in the opposite position with the rudder turned to starboard, again steering the torpedo back toward its course. Thus the torpedo is steered in a sinuous path, crossing and recrossing its initial or aimed course. The gyroscope does no other work than to move the delicate spring $m$ along the contacts $r$ $r'$. Hence it encounters no resistance sufficient to deflect it and impair its action. The work of operating the control-arm $j$ is performed by the magnets U U', which are energized by the battery $q$. This work involves too much resistance to be well performed by the gyroscope itself, but requires only a small battery. If the battery should fail or the circuit be broken, the springs $k$ would hold the control-arm $j$ in its middle position, Fig. 7, where it would not affect either pawl M or M'. The steering apparatus would then operate without control, swinging the rudder continuously between port and starboard.

Fig. 8 shows the course of a torpedo launched from a tube X on a torpedo-boat W. This tube being aimed at the target Z, the direct course is indicated by dotted line $z$. When the torpedo strikes the water at $w$, it is usually deflected, so that it tends to change its course—for example, in the direction of the line $z'$. The steering apparatus controlled by the gyroscope, however, steers it back to the initial course $z$ and finally causes it to steer a sinuous path, as shown, crossing and recrossing the initial course $z$. If the steering mechanism were to become inoperative with the rudder held hard over, the torpedo might steer a circular course—for example, on the dotted line $y$—so that it might come back and strike the boat from which it was fired, as shown at W', or some other boat of the same fleet. This danger is almost wholly avoided by this invention, since any derangement would result in the steering apparatus operating without control, and thereby steering in a sinuous path on a diverted course, such as that indicated at $z'$.

This invention avoids the use of valves, which are liable to stick fast, and substitutes freely-moving mechanical parts. The turning of the rudder from side to side is accomplished automatically by utilizing the full power of the propelling-engine to operate the steering apparatus. The function of the gyroscope is limited solely to manipulating an electric circuit, which in turn has only to so control the light pawls as to cause the rudder to be arrested at extreme port or at extreme starboard long enough to steer the torpedo back to the course from which it was diverted.

What I claim is—

1. In a torpedo-steering mechanism, the combination with steering apparatus acting to swing the rudder continually between extreme port and extreme starboard and thereby to steer the torpedo in a sinuous path, of a controlling mechanism acting to prolong the action of the rudder to either port or starboard.

2. In a torpedo-steering mechanism, the combination with steering apparatus acting to swing the rudder continually between extreme port and extreme starboard and thereby to steer the torpedo in a sinuous path, of a gyroscope, circuits controlled thereby, and an electromagnetic controlling mechanism actuated thereby and adapted to arrest the rudder in its port or starboard positions.

3. In a torpedo-steering mechanism, a steering apparatus comprising constantly-reciprocating pawls, a ratchet-wheel propelled thereby and connected to the rudder, a gyroscope, and a controlling mechanism operated thereby and adapted to throw either pawl out of action to stop the rudder in either extreme position.

4. In a torpedo-steering mechanism, the combination of a ratchet-wheel having a toothless space, constantly-reciprocating pawls for propelling it, a gyroscope, and a controlling mechanism operated thereby comprising a pawl-lifter to throw one pawl out of action and thereby stop the wheel when the toothless space comes under the other pawl.

In witness whereof I have hereunto signed my name in the presence of two subscribing witnesses.

FRANK M. LEAVITT.

Witnesses:
ARTHUR C. FRASER,
FRED WHITE.